No. 764,386. PATENTED JULY 5, 1904.
W. J. SMITH.
DIE HEAD.
APPLICATION FILED MAR. 20, 1900.
NO MODEL. 3 SHEETS—SHEET 1.
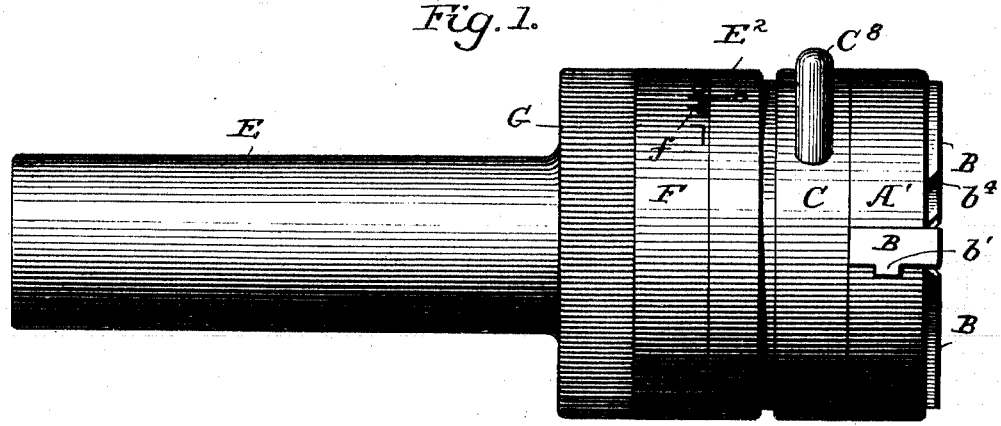
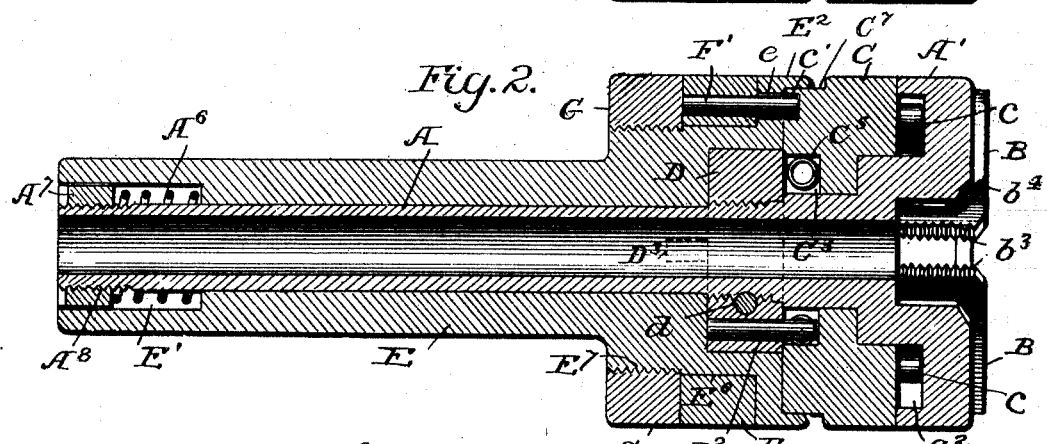
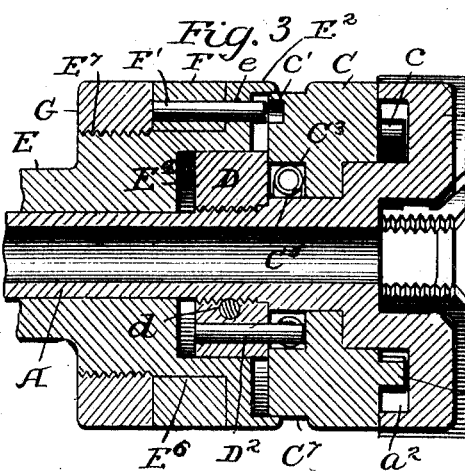
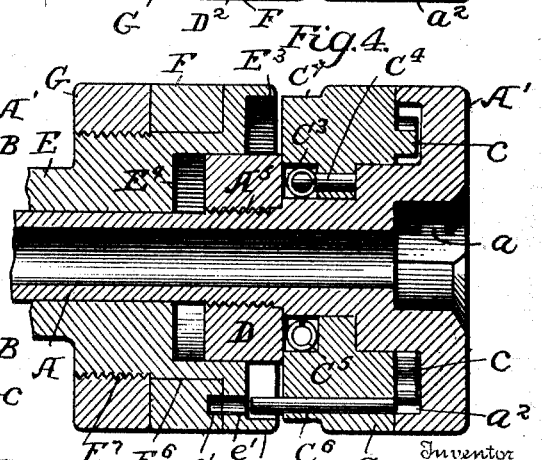
Witnesses
Inventor
William John Smith
Attorneys

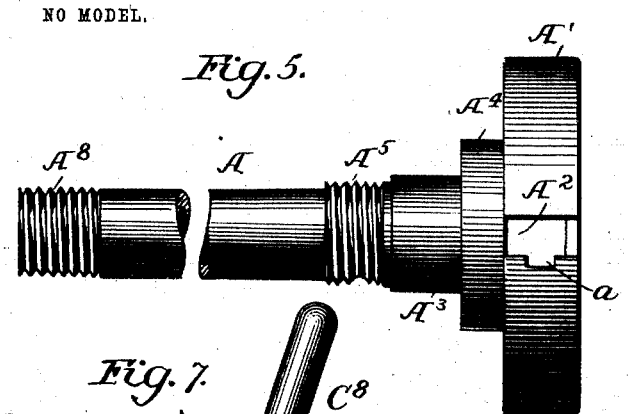
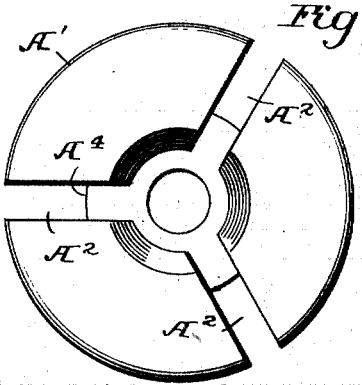
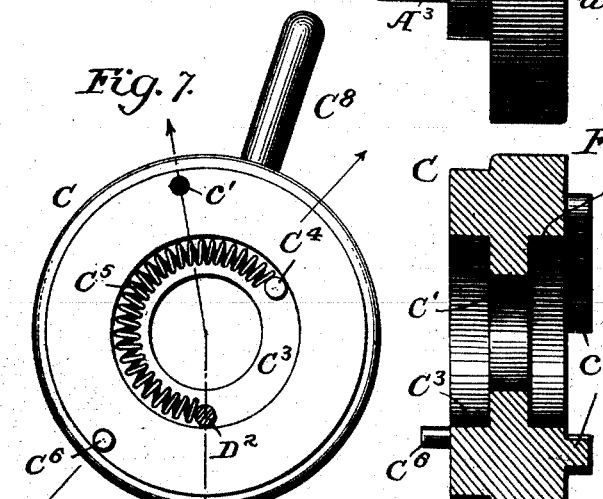
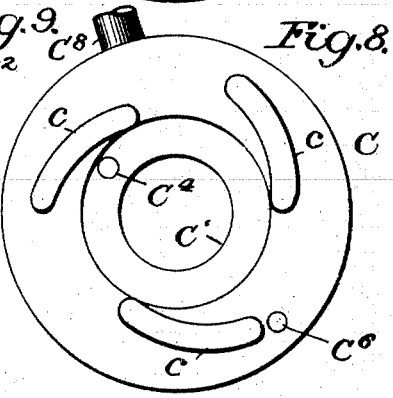
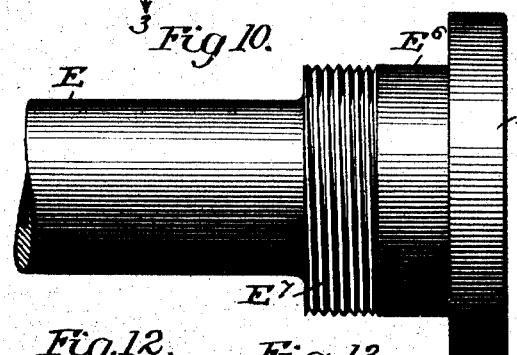
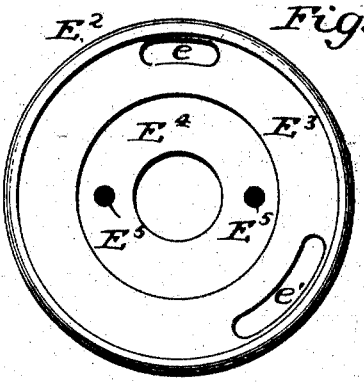
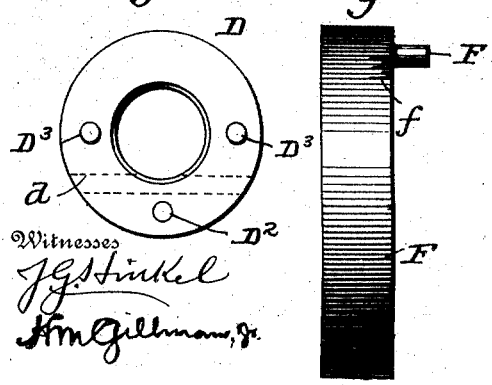
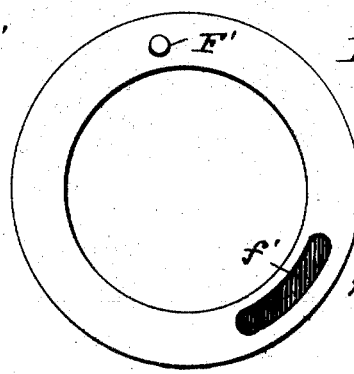

No. 764,386. PATENTED JULY 5, 1904.
W. J. SMITH.
DIE HEAD.
APPLICATION FILED MAR. 20, 1900.
NO MODEL. 3 SHEETS—SHEET 3.
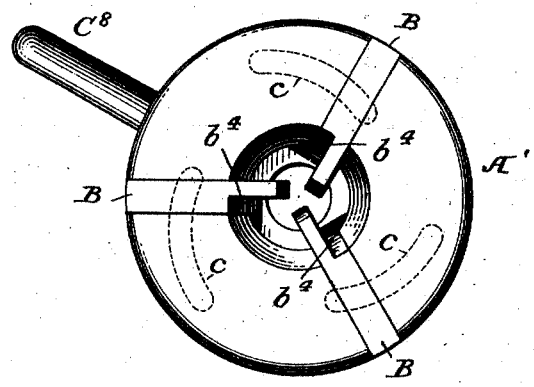
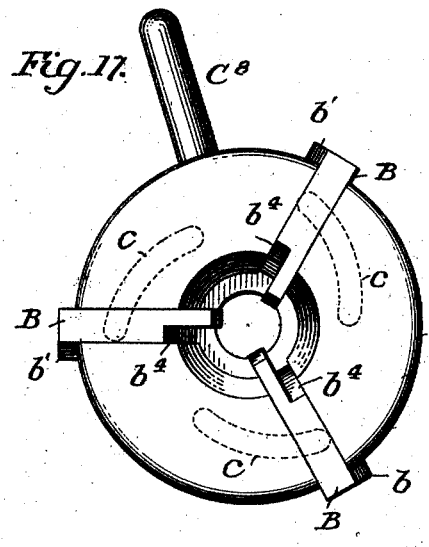
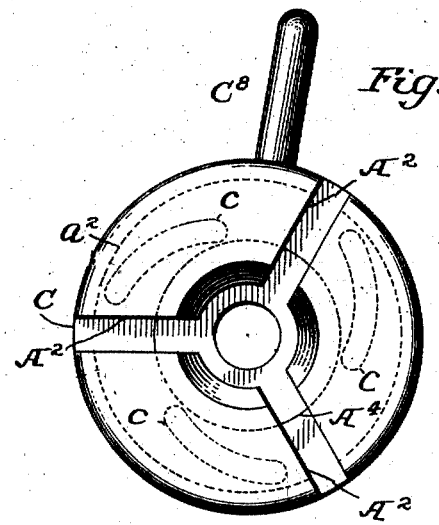

No. 764,386. Patented July 5, 1904.

UNITED STATES PATENT OFFICE.

WILLIAM JOHN SMITH, OF NEW HAVEN, CONNECTICUT, ASSIGNOR TO GEOMETRIC DRILL COMPANY, OF WESTVILLE, CONNECTICUT, A CORPORATION OF DELAWARE.

DIE-HEAD.

SPECIFICATION forming part of Letters Patent No. 764,386, dated July 5, 1904.

Application filed March 20, 1900. Serial No. 9,418. (No model.)

*To all whom it may concern:*

Be it known that I, WILLIAM JOHN SMITH, a citizen of the United States, residing at New Haven, in the county of New Haven and State of Connecticut, have invented certain new and useful Improvements in Die-Heads, of which the following is a specification.

My invention relates to die-heads for screw-cutting and the like, and has for its object to improve and simplify the construction of such devices and provide for their adjustment and operation; and to these ends my invention consists in a die-head embodying the various features of construction and arrangement of parts having the general mode of operation substantially as hereinafter more particularly pointed out.

Referring to the accompanying drawings, wherein I have chosen to illustrate a die-head adapted to cut screws of one-eighth-inch diameter and wherein the drawings are practically three times the size of the actual tool for convenience of illustration, Figure 1 is a side elevation of the tool. Fig. 2 is a vertical longitudinal section of the same, showing the parts in locked or operative position. Fig. 3 is a similar section of a portion of the tool, showing the parts in the normal or unlocked position ready to receive the material to be operated upon, taken on the line 3, Fig. 7. Fig. 4 is a similar view, showing the position of the parts when the cutters are released from the die-head, on line 4, Fig. 7. Fig. 5 is a side view, and Fig. 6 an end view, of the skeleton shell and head-piece. Figs. 7, 8, and 9 are respectively front and rear views and cross-sectional view of the cam-piece. Fig. 10 is a side elevation, and Fig. 11 an end view, of the sleeve. Fig. 12 is a side elevation of the retaining-collar. Figs. 13 and 14 are respectively an edge view and side elevation of the graduated adjusting-ring. Fig. 15 is a side view of one of the cutters; and Figs. 16, 17, and 18 are end views showing the relative positions of the cams when the cutters are in working, normal, and released position.

One of the principal objects of this invention is to provide a small and compact tool of the character described which shall be adapted to operate in the limited space which exists in turrets and similar supports of screw-cutting or other machines to which the device is applied.

Another object is to avoid the use of screws to hold the parts together, and more particularly to avoid the employment of any attachment projecting beyond the circumferential periphery of the head-piece.

Another object of the invention is to so construct and arrange the parts that the cutters may be adjusted inward and outward into operative positions by means contained within the normal circumference of the tool and without any projections or extensions beyond the face of the tool or outside of the cutters.

Another object is to provide an improved construction and arrangement of cutters, which fit directly in the head-piece and are held securely therein while being adjustable.

Another object is to provide improved means for adjusting the cutters in their locked or operative position and for automatically releasing them in their unlocked or normal position and, further, to permit such an adjustment that the cams may be released from the cutters and the cutters replaced or adjusted in position. In connection with the adjustment of the cutters in their operative and normal positions means are provided for graduating the cut so that very exact and accurate work can be accomplished and the adjustment made with little or no delay or trouble.

These and various other objects, which will be more apparent from the annexed description, are accomplished and carried out in the embodiment which will now be described, and it is to be understood that while I shall describe the exact details of construction illustrated in the drawings the invention is not limited thereto, as these details can be changed and varied by those skilled in the art to accomplish substantially the same result without departing from the spirit of the invention, and some features of the invention may be used separately or in connection with other features or with other equivalent features.

Referring to the drawings, A represents the cutter-carrying part, which may be termed a "shell" and which can have a limited longitudinal movement within the stock, composed of the sleeve-like shank E and its enlarged head $E^2$. The shell A is made hollow from end to end, as clearly seen in Fig. 2, and in this way permits the use of the tool to make a screw-thread of any desired length, there being no internal devices or constructions within the body of the shell. Connected to and forming an integral part of this shell is a head-piece A', and this head-piece is adapted to carry the cutters B, which are mounted therein. In the present instance the head is adapted to hold and support three cutters B in the slots $A^2$; but of course any number of cutters may be mounted in the head in a similar manner, according to the requirements of any particular case. These cutters consist of a body portion $b$, adapted to fit the slots $A^2$, and on one of the faces is a rib $b'$, adapted to fit a groove $a$ in the side of the slots $A^2$, and on one edge there is a cam-slot $b^2$, and the cutting edge $b^3$ is preferably reduced and of less thickness than the body $b$, although this will vary according to circumstances, and the corner of the body on its front edge is preferably cut away, as at $b^4$, to make room for the chips and prevent them from interfering with the cutting operation. These cutters B, as will be readily seen, fit in the slots $A^2$, and preferably their front edges project slightly beyond the front face of the head-piece A', and this further permits room for the chips and allows the tool to be used to cut a screw up close against an abutment, there being nothing projecting beyond or in front of the advance cutting edge of the cutters. With this arrangement it will be seen that the cutters instead of being mounted on carriers, as is common, are mounted directly in the head-piece and are furnished with relatively broad bearing-faces therein, and being guided by the ribs $b'$ they are held accurately in position and alinement and at the same time can be freely moved in and out of operative position by the cams, as hereinafter described, engaging the cam-slots therein, and, further, by arranging the apparatus so that the cams are disengaged from the cam-slots they may be easily removed and replaced when occasion requires.

Loosely mounted on the shell, which is provided with enlarged bearing-surfaces $A^3$ $A^4$, is the cam-piece C. (Shown more in detail in Figs. 7, 8, and 9.) This cam-piece is provided with a central inward extension C', supported on the bearing-surface $A^3$, and with an enlarged bearing $C^2$, fitting the enlarged bearing-surface $A^4$ of the shell. On the front face of the cam-piece are arranged the cams $c$ $c$ $c$, there being three in the present instance, corresponding with the number of cutters, and these cams project into a groove or recess $a^2$ in the head-piece, and the cams engage the cam-slots $b^2$ in the cutters and serve to move them into and out of operative position and to hold them in place. It will be seen that these cams are within the peripheral surface of the head-piece and are covered and protected thereby, so that danger of dust or dirt interfering with the operation of the cams is avoided. The opposite face of the cam-piece is recessed at $C^3$ and is provided with a pin $C^4$, projecting into the recess, which serves as an abutment for a cam-spring $C^5$. This face of the cam-piece is also provided with a pin $C^6$, the function of which will be seen hereinafter. The cam-piece is held in position on the shell by what I have termed a "retaining-collar" D, (shown in rear side view in Fig. 12,) and this collar is screw-threaded internally and is adapted to be mounted on the shell and connected thereto by the screw-threaded portion $A^5$, and some suitable means is preferably provided for locking this retaining-collar in place, and this may be accomplished in any of the usual ways or, as shown, by a pin $d$, Fig. 2, passing through an opening and engaging a reduced portion of the screw-threaded portion $A^5$, locking the parts together. This retaining-collar is provided on its forward side with a pin $D^2$, which projects into the recess $C^3$ in the cam-piece and forms a stationary abutment for the cam-spring $C^5$. Projecting from the rear side of the retaining-collar are some means for securing and holding the shank or sleeve E, and in the present instance I have shown two pins $D^3$ $D^3$ for this purpose. The sleeve E, which, with its enlarged head $E^2$, constitutes the supporting-stock, as before stated, is recessed at E' to receive a spring $A^6$, acting to keep the die-carrying shell A drawn back into the stock, Fig. 2, by bearing against an adjustable nut $A^7$, fitting a screw-threaded portion $A^8$ of the shell. The head $E^2$ of the sleeve is recessed at $E^3$, so as to permit it to fit over a reduced portion $C^7$ of the cam-piece, and the head is further recessed at $E^4$ to fit over the retaining-collar D, and this recessed portion is provided with openings $E^5$ to receive the locking-pins $D^3$ of the retaining-collar. The recessed portion $E^3$ is also provided with segmental slots or openings $e$ $e'$, arranged substantially as shown in Fig. 11, and the latter, $e'$, serves to receive the pin $C^6$ of the cam-piece and to limit the motions of the cam-piece in moving the cutters into and out of locked and normal positions. Loosely mounted on the head of the sleeve, as at $E^6$, is an adjusting-ring F, having a graduation $f$ on its peripheral face, and projecting from its front side is a pin F', which normally passes through the opening $e$ in the head $E^2$ of the sleeve E and engages the hole $c'$ in the rear face of the cam-piece C. Also in the face of the ring is a recess $f'$, corresponding in shape to the slot or opening $e'$ in the head $E^2$ of the sleeve and into which the pin $C^6$ of the cam-piece projects when the parts are in their locked positions.

Some means must be employed for securing the adjusting-ring F in its adjusted position, and while various means may be used I have shown a clamp-ring G engaging a screw-threaded portion $E^7$ of the sleeve E. With this arrangement it will be seen that by loosening the clamp-ring G the adjusting-ring F may be turned within the limits of the slot $e$, and as the pin F' passes through the slot and engages the hole $c'$ in the cam-piece it is evident that the position of the cam-piece can be adjusted so that the cutters may be thrown in and out from a definite point, and then by tightening the clamp-ring the parts are securely held together under normal conditions. To more fully explain this, it may be said that the cams $c$ are made of sufficient length and are so placed that they can throw the cutters in and out, starting from different points of adjustment, and the pin F' being in fixed relation to the cam-piece and to the adjusting-ring they will both be adjusted with relation to the projecting head $E^2$ of the sleeve, and the sleeve is held in fixed relation to the shell by the pins $D^3$ of the retaining-collar entering the openings $E^5$, and after the parts are once adjusted and secured by the clamp-ring the cams $c$ will move with a certain relation to the cutters, forcing them in and out into their locked and normal positions.

Such being the general construction of the parts, their assemblage will be readily understood, and when they are in the positions shown in Fig. 2 the adjustment of the nut $A^7$ confines the parts together and at the same time permits the sleeve to move longitudinally on the shell and to rotate thereon when not prevented by the pins $D^3$ of the retaining-collar. In Fig. 2 the parts are shown in what I have termed the "locked" or "screw-cutting" position when the cam-piece C has been rotated to force the cutters inward against the material to be screw-threaded, and it will be seen that all the parts are positively connected, so that a screw of any length may be cut. In general practice of course the tool is mounted in a turret or other support, the sleeve E being the means by which it is mounted, and this turret or holder usually travels on a suitable bed, which is provided with some sort of a stop device to determine the length of the screw-thread to be cut. This device permits the automatic disengagement of the cutters when a screw of a predetermined length has been cut. The sleeve being held in a stationary position and the cutters continuing the cutting motion on the screw-threaded material, which is rotated, causes the shell to move forward against the pressure of the spring $A^6$ until the cam-piece C is moved so far that the pin F' is drawn out of the hole $c'$ in its face, when the cam-piece under stress of the spring $C^5$ flies backward, its movements being controlled or limited by the pin $C^6$ passing through the slot or opening $e'$ in the head $E^2$ of the sleeve and into the recess $f'$ of the adjusting-ring. This of course moves the cams $c$ in the proper direction to force the cotters B outward, releasing the screw-threaded piece, which may then be withdrawn and a new piece inserted. When this is done, the cam-piece is turned to its locked position, forcing the cutters inward against the piece to be screw-threaded until the pin F' comes opposite the hole $c'$, when the spring $A^6$ forces it into engagement and the cams are locked. This operation may be facilitated by a suitable handle $c^8$, attached to the cam-piece C, or any other means of adjusting the cam-piece may be employed. So, too, the tool may be used in any other way than that above indicated, and any other means may be utilized to cause the automatic release of the cutters at the time desired, it being only necessary to move the shell A in a longitudinal direction with relation to the sleeve E far enough to release the pin F' from the hole $c'$, when the cam-piece will be automatically operated by the cam-spring $C^5$ to open the cutters, and the parts will assume the positions indicated in Fig. 3. When it is desired to remove the cutters B for any purpose, it is only necessary to further move the shell A longitudinally with relation to the sleeve E into the position indicated in Fig. 4, wherein the pin $C^6$ is withdrawn from the slot $e'$ in the head $E^2$ and from the recess $f'$ in the adjusting-ring F, and the cam-piece then under the further influence of the cam-spring $C^5$ will fly around until the pin $C^4$ abuts against the pin $D^2$, and this will result in moving the cams $c$ entirely out of the cam-slots $b^2$ in the cutters, when the latter can readily be moved from the slots $A^2$ and replaced or restored to position, as desired.

It will thus be seen that with my construction I provide a very simple device having no projecting parts except the handle $C^8$, which may or may not be used, and all the operating parts are self-contained within the circumference of the head-piece A'. Moreover, all the operating parts are protected from dust and dirt and still are accessible for adjustment or replacing in case of accident. The die works automatically by a simple longitudinal movement of one part with relation to the other and by a further movement provides for the removal and adjustment of the cutters. It also provides for the adjustment of the relative positions or limits of movement of the cutters, so that extremely-accurate work can be accomplished; and when it is desired to change the size or pitch of the screw being cut the cutters are quickly released and may be removed and replaced by others adapted to make the desired screw-thread. These operations can be accomplished without the removal or adjustment of any of the parts beyond the sliding longitudinally of one part on another. The whole device is exceedingly compact and small for a tool adapted to cut screw-threads the size and pitch of which vary within the extreme limits of its capacity. Moreover, by providing the head-piece with a thin hollow shell-like extension, mounting the tubular supporting-sleeve with its head so as to turn and to move longitudinally with relation thereto, and arranging the cam-piece between the heads the parts are made small and of the requisite strength and the operative parts are locked and released by devices within the heads.

Having thus described the general principles of my invention and pointed out the preferred way of embodying them, what I claim is—

1. The combination of a stock with a head-piece having slots, cutters fitting said slots, a rotary cam-piece in the rear of said cutters for moving the cutters in the slots, and means for locking the cam-piece, the head-piece being longitudinally movable with relation to the stock to release said locking means.

2. The combination of a stock with a head-piece provided with slots in its outer face, cutters fitting said slots and provided with cam-slots in their rear faces, the head-piece being recessed at the rear adjacent to said cam-slots, cams extending into said recessed portion and engaging the slots of the cutters, and means for locking the cams, the head-piece being longitudinally movable with relation to the stock to release said locking means.

3. A die-head comprising a stock, a shell movable longitudinally therein and having a head-piece provided with slots in its outer face, cutters fitting said slots and provided with cam-slots in their rear faces, the head-piece having a recess at the rear adjacent to said cam-slots, cams extending into said recessed portion and engaging the slots of the cutters, and means to lock the cutter-head with relation to the cams, the head-piece being movable longitudinally with relation to the stock to release said locking means.

4. A die-head comprising a stock, a shell movable longitudinally therein and having an integral head-piece provided with slots in its outer face, cutters movable in said slots and provided with cam-slots in their rear faces, the head-piece having a recess in its rear portion, in combination with a rotatable cam-piece having cams projecting into said recess and engaging the slots in the cutters, and means to lock the cutter-head with relation to the cams, the head-piece being movable longitudinally with relation to the stock to release said locking means.

5. In a die-head of the character described, means for normally holding the cutters in cutting position, means for releasing said holding means to allow the cutters to expand, and means which when released allow the cutters to be withdrawn, substantially as described.

6. A die-head comprising a shell having a head-piece, cutters adjustably and removably mounted on said head-piece, a cam-piece controlling the position of the cutters, a sleeve mounted on the shell and adapted to assume three positions with relation thereto, means for normally holding the cutters in operative position when the shell is in one position with relation to the sleeve, means for releasing said holding means to allow the cutters to expand when the shell is in another position with relation to the sleeve, and means which when released on a further movement of the shell allow the cutters to be withdrawn, substantially as described.

7. A die-head comprising a shell having a head-piece provided with slots, cutters mounted in said slots, a cam-piece mounted on the shell, a sleeve also mounted on the shell, connections between the sleeve and shell permitting longitudinal movement with relation to each other, and means substantially as described whereby when the sleeve is moved a certain distance on the shell the cam-piece may be operated to adjust the cutters into working or normal position and further means whereby when the sleeve is moved farther the cam-piece releases the cutters, substantially as set forth.

8. A die-head comprising a shell having a head-piece provided with slots, cutters mounted in said slots, a cam-piece mounted on the shell having cams controlling the cutters, a sleeve mounted on the shell, connections between the sleeve and shell permitting longitudinal movement with relation to each other, connections between the cam-piece and the sleeve, and a spring controlling the cam-piece whereby when the sleeve is moved longitudinally with relation to the shell to release said connections the cam-piece is automatically operated to move the cutters out of working position, and further connections between the cam-piece and sleeve whereby on a further longitudinal movement of the sleeve with relation to the shell the cam-piece is automatically operated to release the cutters, substantially as described.

9. A die-head comprising a shell having a head-piece, cutters mounted therein, a cam-piece having cams controlling the movements of the cutters, means for retaining the cam-piece in position, a sleeve mounted on the shell, an adjusting-ring mounted on the sleeve, a clamp-ring therefor, and connections between the sleeve and cam-piece, substantially as described.

10. A die-head comprising two members one of which is movable with relation to the other, one carrying cutters, a cam-piece controlling the movements of the cutters, means for normally holding the cutters in operative position, means for releasing said holding means to allow the cutters to be expanded, and means which when released allow the cutters to be withdrawn, these three means being operative for the purposes stated in three different relative positions of the movable members, substantially as described.

11. The combination of a head-piece carrying radially-movable cutters and a support for said head-piece, a rotary cam-piece to move said cutters, means to lock the cam-piece and head-piece together when the cutters are moved to cutting position and a rotarily-adjustable ring mounted on such support, and carrying one of the locking elements.

12. The combination of a stock, a head-piece supported thereby and carrying radially-movable cutters, a rotary cam-piece to move said cutters, means to lock the cam-piece and head-piece together when the cutters are moved to cutting position, and a rotarily-adjustable ring fixed on the stock and carrying one of the locking elements, the head-piece being movable longitudinally with relation to the stock to release said locking means.

13. The combination of the stock and cutters with a rotary cam-piece to move the cutters to cutting position and means to lock the cutter-carrying part and the cam-piece together when the cutters are in cutting position, said locking means including a rotarily-adjustable ring behind the cam-piece and carrying one of the locking elements.

In testimony whereof I have signed my name to this specification in the presence of two subscribing witnesses.

WILLIAM JOHN SMITH.

Witnesses:
PHILIP F. LARNER,
F. L. FREEMAN.